United States Patent [19]
Job et al.

[11] Patent Number: 5,927,890
[45] Date of Patent: Jul. 27, 1999

[54] THERMALLY RELEASED SEPARATION DEVICE, PARTICULARLY FOR FIRE PROTECTION SYSTEMS

[75] Inventors: Eduard J. Job, Ahrensburg; Christian Schnoor, Lübeck; Christian Bergmann, Brüsewitz, all of Germany

[73] Assignee: JOB Lizenz GmbH & Co., KG, Ahrensburg, Germany

[21] Appl. No.: 08/916,079

[22] Filed: Aug. 21, 1997

[30] Foreign Application Priority Data

Aug. 30, 1996 [DE] Germany .................. 196 35 177

[51] Int. Cl.⁶ .................................................. F16P 3/00
[52] U.S. Cl. .......................... 403/2; 403/28; 403/391
[58] Field of Search .......................... 403/2, 28, 391, 403/396; 248/909, 548; 285/3, 187; 292/DIG. 66; 220/201; 337/150, 151, 152, 153, 154; 169/60, 56; 24/575, 602

[56] References Cited

U.S. PATENT DOCUMENTS

| | | |
|---|---|---|
| 1,816,017 | 1/1931 | Loepsinger . |
| 2,947,055 | 8/1960 | McHenry ............................ 403/396 |
| 3,779,004 | 12/1973 | Gloeckler ............................ 24/602 |
| 5,018,770 | 5/1991 | Beasley ............................ 285/3 X |
| 5,653,004 | 8/1997 | Russo ............................ 24/575 |

FOREIGN PATENT DOCUMENTS

| | | |
|---|---|---|
| 510552 | 7/1980 | Australia . |
| 0339788 | 11/1989 | European Pat. Off. . |
| 1559693 | 1/1970 | Germany . |
| 3736242 | 5/1989 | Germany . |

*Primary Examiner*—Peter M. Cuomo
*Assistant Examiner*—Karlena D. Schwing
*Attorney, Agent, or Firm*—Friedrich Kueffner

[57] ABSTRACT

A thermally released separation or disconnecting device, particularly for fire protection systems, includes two oppositely arranged joining members which are connected to each other and are subjected to a tensile force. A destructible thermal release element is held between the joining members. The joining members are constructed as stirrups with two legs each, wherein the stirrups equally absorb the tensile force. The destructible thermal release element is held between oppositely arranged legs of the stirrups and extends essentially perpendicularly of the direction of the tensile force in the locked position of the separation device. Each leg of one stirrup holding the thermal release element is connected in the locked position of the separation device to the other leg of the other stirrup in a positively engaging manner against the direction of the tensile force.

11 Claims, 2 Drawing Sheets

5,927,890

THERMALLY RELEASED SEPARATION DEVICE, PARTICULARLY FOR FIRE PROTECTION SYSTEMS

BACKGROUND OF THE INVENTION

1. Field of the Invention

The present invention relates to a thermally released separation or disconnecting device, particularly for fire protection systems. The separation device includes two oppositely arranged joining members which are connected to each other and are subjected to a tensile force. A destructible thermal release element is held between the joining members.

2. Description of the Related Art

Separation devices of the above-described type are arranged between two ropes or similar pull elements, so that the stirrup-shaped joining members thereof are under tensile stress. The devices are used, for examples, in fire extinguishing devices or opening and closing devices, which trigger a safety function when a certain temperature is exceeded, for example, open or close valves, open smoke outlet flaps and closing flaps in ventilation ducts.

The present invention is directed to a separation device as it is disclosed, for example, in German patent application 1 559 693. In that separation device, the release element is formed by a thermally released glass bulb or ampul. When a certain temperature is exceeded, this glass bulb is destroyed and releases the separation device, i.e., the stirrup-shaped joining members can move apart from each other in order to trigger the appropriate safety measure. The tensile forces, which act on the joining members and, thus, may be transmitted more or less to the glass bulb, may be relatively great. In the separation device according to German patent application 1 559 693, the force parallelogram formed by the joining members acts in such a way that only a compressive force is transmitted to the glass bulb. Because of the unfavorable arrangement within the parallelogram, this compressive force is even greater than the tensile force. This is not acceptable in many cases. The glass bulb must be constructed with an appropriately high strength which, in turn, impairs the response sensibility. Modern glass bulbs are slender and respond much more quickly. For this reason, it is advantageous to reduce the compressive forces and to utilize the slender, quickly responding glass bulb. Because of their high reliability, glass bulbs have been found very useful as thermal release elements in sprinklers.

SUMMARY OF THE INVENTION

Therefore, it is the primary object of the present invention to provide a separation device of the above-described type in which only a small compressive force acts on the thermal release member in the locked position of the separation device, wherein the compressive force is about 70% smaller than the tensile force acting on the joining members. Moreover, the separation device should be of simple construction and should operate reliably when a situation occurs when a response is required.

In accordance with the present invention, the joining members are constructed as stirrups with two legs each, wherein the stirrups equally absorb the tensile force. The destructible thermal release element is held between oppositely arranged legs of the stirrups and extends essentially perpendicularly in the direction of the tensile force in the locked position of the separation device. Each leg of one stirrup holding the thermal release element is connected in the locked position of the separation device to the other leg of the other stirrup in a positively engaging manner against the direction of the tensile force.

In the separation device according to the present invention, the stirrups form a rhombic frame in which the thermal release element is arranged perpendicularly of the direction of the tensile force. The tensile forces are distributed symmetrically to the stirrups, i.e., the upper and lower portion and each locking connection is subjected only to about 50% of the total tensile forces. The stirrups form a force parallelogram in which the thermal release element is subjected to a compressive force in a direction extending perpendicularly of the direction of the tensile force. Because of the arrangement transversely of the direction of the tensile force, the compressive force is about 70% lower than the tensile force.

The stirrups are manufactured so as to be slightly pretensioned. Specifically, the legs of the each stirrup are pretensioned in a resilient manner in the direction toward the axis of the thermal release element. This configuration is advantageous in order to hold the stirrups in the frictional engagement thereof and supported by the thermal release element. Because the stirrups are slightly pretensioned, the thermal separation device responds also when there is no tensile load.

The actual separation occurs as a result of a collapse of the force parallelogram when the thermal release element is destroyed under the influence of heat.

In accordance with a feature of the present invention, the two legs of each stirrup extend beyond the center axis of the thermal release element. Consequently, when the parallelogram collapses, the tensile load causes a hook of each leg which supports the thermal release elements to be forced out of an opening of the other leg which does not hold the thermal release element. The forces with which the one leg is levered out of the other leg are proportional to the tensile forces, i.e., as the tensile forces increase, the lever force is also increased. This is due to the fact that, as mentioned above, the legs extend beyond the center axis of the thermal release element.

The actual force parallelogram extends between the point of application of the tensile forces and the contact points with the thermal release element. The tensile forces are conducted slightly around the force parallelogram, so that a slight spring effect is achieved.

In accordance with an advantageous feature of the present invention, each leg of the stirrups which is not supporting the thermal release element is angle-shaped. This angle-shaped configuration of the leg of each stirrup produces the desired parallelogram which receives in its center the thermal release element. Simultaneously, the legs hold each other in the locked position.

In accordance with a particularly advantageous feature, each leg of the stirrups which supports the thermal release element has at the end thereof a hook which produces the positively engaging connection in the locked position of the separation device. Each hook is hooked into an opening of the respectively other leg in such a way that, when the thermal release element is destroyed, the connection is safely separated, while the tensile forces are transmitted when the separation device is in the locked position.

In accordance with another feature of the invention, at the end of the leg of each stirrup which does not support the thermal release element, a lug is formed which extends wedge-shaped toward the end of the leg, wherein, in the locked position of the separation device, the lug is inserted into a correspondingly wedge-shaped window in the adjacent leg of the other stirrup which supports the thermal release element. As a result of this feature, the lug not only ensures a safe support and positioning of the legs relative to the thermal release element in the locked position, but the wedge shape of the lug and the shape of the window also ensure that the two stirrups are not twisted relative to each other about the tension axis. Moreover, the engagement of the lug in the window ensures that the stirrups are not pushed toward each other when compressive forces act on the separation device.

In accordance with another feature, each stirrup has an eyelet constructed as a ring-shaped spring for transmitting the tensile force. This provides the advantage that the spring force which exerts the pretension is made available by the eyelets which form the actual spring elements.

In accordance with another feature, each stirrup has an eyelet for transmitting the tensile force, wherein the eyelet is formed by twisting the joining member or flat steel by 90% about the tension axis. This produces flat eyelets which are particularly suitable for mounting on pins or bolts. On the other hand, the eyelets in the form of ring-shaped springs are suitable for the connection to tension ropes.

The present invention advantageously provides a separation device which preferably is composed of two identical stirrups of hardened spring steel which hold the thermal release element in the locked position in such a way that the rhombic force parallelogram transmits a compressive force to the thermal release element which is relatively small as compared to the tensile force. In the situation in which a response is required, the thermal release element is not insulated or screened. An increase in temperature is quickly transmitted to the thermal release element and the thermal release element responds when a certain temperature is exceeded. The rhombus formed by the stirrups collapses, so that the positively engaging connection is released and the desired separation occurs.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
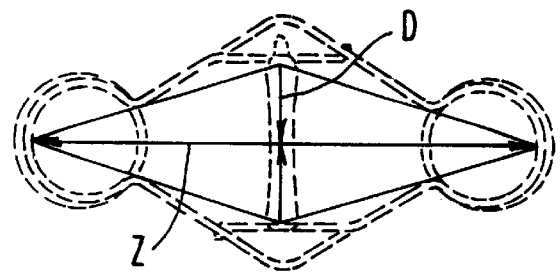
FIG. 1 is a side view of an embodiment of the separation device according to the present invention, shown with force parallelogram.
Figure 2:
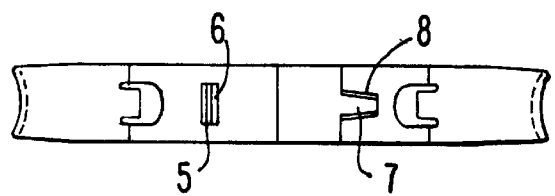
FIG. 2 is a top view of an embodiment of the separation device according to the present invention.

In FIG. 1 of the drawing, D denotes the compressive force acting on the thermal release element and Z denotes the tensile force.

In the drawings, the same components are provided with the same reference numerals. In both embodiments shown in the drawing, the stirrup-shaped joining members 2, 3 are of hardened spring steel.

The stirrups 2, 3 of the embodiment of FIGS. 2 to 5 are manufactured from flat strip steel. Each stirrup 2, 3 has an eyelet 4 which simultaneously forms a ring-shaped spring. Two different legs 10 and 11 extend from the eyelet 4. Each leg absorbs approximately 50% of the tensile forces.

Figure 3:
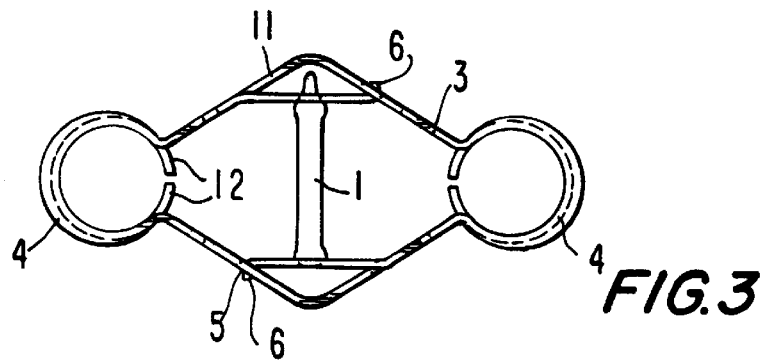
FIG. 3 is a side view of the separation device of FIG. 2 shown in the locked position.
Figure 4:
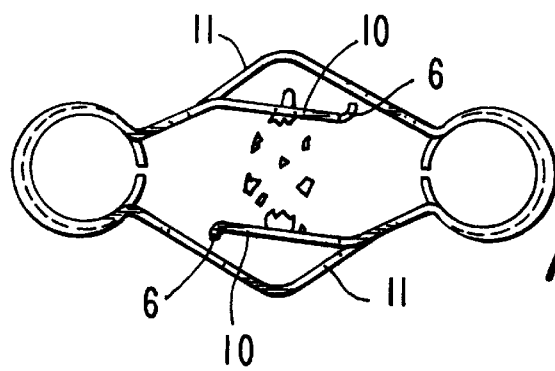
FIG. 4 is a side view of the separation device of FIG. 2 shown immediately after the destruction of the glass bulb.
Figure 5:
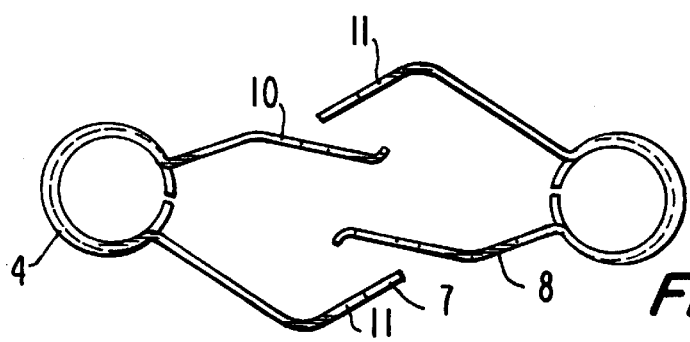
FIG. 5 is a side view corresponding to FIGS. 3 and 4, but shown after the separation of the two joining members.

As shown in FIG. 3, the two stirrups 2, 3 are in their normal locked position. A glass bulb 1 is arranged between the two stirrups 2, 3. The two stirrups 2, 3 are held in a locked position as a result of a positive engagement and a slight pretension resulting from the glass bulb 1. The tensile force which acts on the two stirrups extends through the center points of the two eyelets 4 as seen in the plane of the drawing of FIGS. 3 through 5. The glass bulb 1 is supported by the two legs 10 of each stirrup 2, 3 which each includes a portion which extends approximately in the direction of the tensile force and has an opening for supporting the bulb 1. The other leg 11 of each stirrup 2, 3 is angle-shaped, with the vortex being located approximately in the axis of the bulb 1. This other leg 11 supports the leg 10 of the other stirrup holding the class bulb 1.

In order to connect the two stirrups safely to each other in order to carry out the desired function and to absorb the tensile force, the ends of the legs 10 are provided with hooks 6 which engage in openings 5 of the adjacent leg 11 of the other stirrup. In the locked position of the separation device, the connection between hook and opening absorbs at the top and at the bottom half of the tensile forces each. The ends of the legs 11 have a lug 7 which extends wedge-shaped in the direction toward the end of the leg 11. In the locked position of the separation device, this lug 7 is inserted into a correspondingly wedge-shaped window 8 of the adjacent leg 10 which supports the glass bulb 1.

The legs of the stirrups are slightly pretensioned in the direction toward the glass bulb 1. The spring force for this pretensioning is made available by the ring-shaped eyelet 4 which simultaneously forms a spring.

Projections 12 are concentrically cut out of the two legs of the stirrup and almost close the eyelet. This almost closed configuration of the eyelet ensures that the rope can move in the direction toward the release element if no tensile force acts on the release element.

It is readily apparent that, in the locked position of the separation device, the hook 6 of each leg 10 supporting the glass bulb 1 is inserted in the corresponding opening 5 of the other leg 11 of the other stirrup, and that the wedge-shaped lugs 7 of the legs 11 which do not support the glass bulb 1 are inserted in the corresponding windows 8 of the adjacent legs 10 supporting the glass bulb 1. A compressive force acts on the glass bulb 1, wherein the compressive force is essentially about 30% of the total force. The pretensioning forces are negligibly small.

When a situation occurs when a response is required, i.e., when the glass bulb 1 is destroyed as a result of the influence of heat, the force parallelogram has the tendency to collapse. However, this is prevented at first because the leg which does not support the release element still extends beyond the center axis of the release element and rests with its end, i.e., where the leg 11 becomes narrower to form the lug 7, on the other leg 10 and rotates this leg 10 against the direction of the hook 5 and, thus, forcibly opens the locked position. Since both forces are proportional, the release element acts to unlock reliably even in the case of high tensile forces. Since the stirrups 2, 3 are slightly pretensioned, the separation device opens also without tensile forces.

Figure 6:
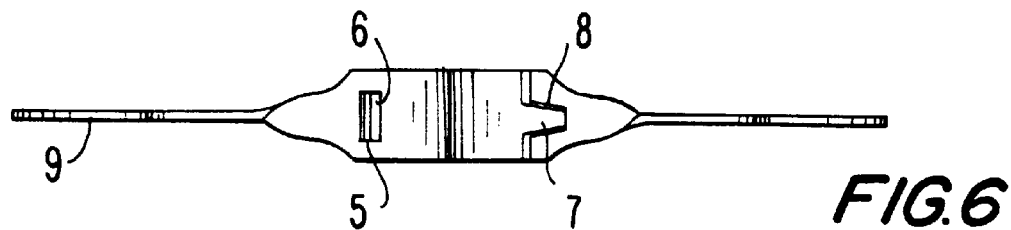
FIG. 6 is a top view of another embodiment of the separation device according to the present invention.
Figure 7:
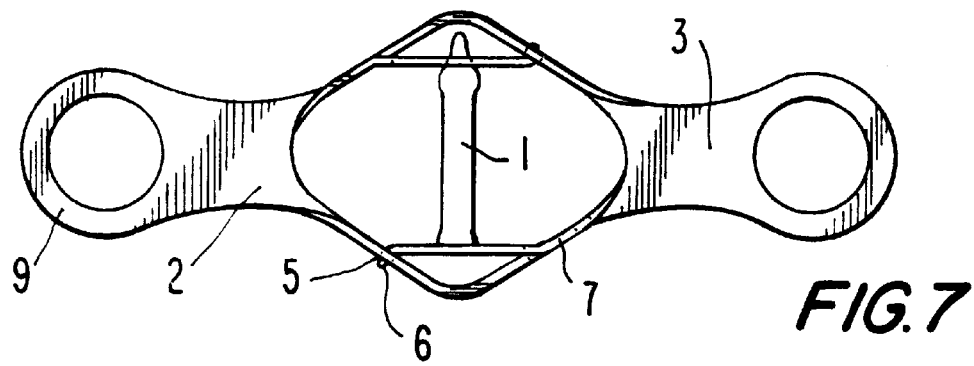
FIG. 7 is a side view of the separation device of FIG. 6, shown in the locked position.

The embodiment of the invention shown in FIGS. 6 and 7 is basically constructed in the same way as the embodiment of FIGS. 2 to 5.

Figure 8:
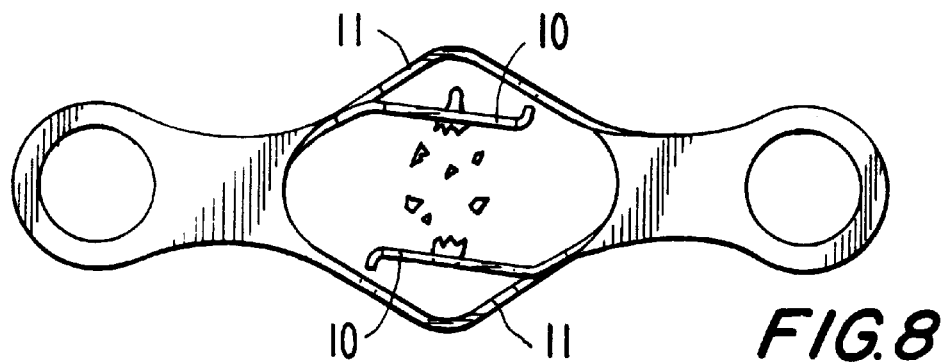
FIG. 8 is a side view corresponding to FIG. 7, showing the separation device immediately after the destruction of the glass bulb.
Figure 9:
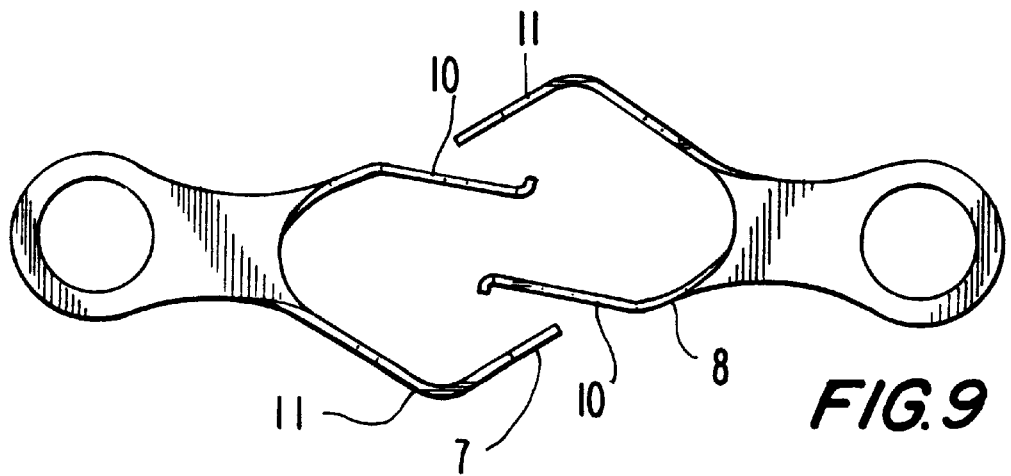
FIG. 9 is a side view corresponding to FIGS. 7 and 8, showing this embodiment after the separation of the joining members.

Only the eyelet 9 has a different configuration. The eyelet is produced by twisting the blank of sheet metal of which the stirrups are composed by 90% about the tension axis, so that flat eyelets 9 are produced which can be easily connected to bolts or screws. This is readily apparent when looking at FIGS. 6 through 9. The spring force which produces the pretensioning force acting on the class bulb 1, is inherent in the legs. As is the case in the embodiment according to FIGS. 2 to 5, this pretensioning force acts in such a way that, in case a response is required and the class bulb 1 is destroyed, the hooks 6 are safely pushed out of the openings 5 and assume the position shown in FIG. 8.

The stirrups are preferably identical in both embodiments. They are arranged symmetrically relative to each other, merely turned by 180% about the tension axis. This ensures that the separation device is inexpensive to manufacture. The stirrups are manufactured from a blank of sheet metal which is hardened after the deformation thereof.

Instead of the glass bulb 1, it is also possible to use other thermal response elements, for example, soldered elements.

It is not necessary that each stirrup is composed of one piece. The stirrup may also be composed of several pieces, as long as the forces are transmitted as described above.

While specific embodiments of the invention have been shown and described in detail to illustrate the inventive principles, it will be understood that the invention may be embodied otherwise without departing from such principles.

We claim:

1. A thermally released separation device, particularly for fire protection systems, the device comprising two oppositely arranged joining members, wherien the joining members are connected to each other and are subjected to a tensile force, and a destructible thermal release element arranged between the joining members, the joining members being constructed as stirrups configured to absorb the tensile force equally, each stirrup having a first leg and a second leg, wherein, in a locked position of the separation device, the destructible thermal release element is held between the first legs of the stirrups so as to extend essentially perpendicular to a direction of the tensile force, and wherein, in the locked position of the separation device, the first leg of each stirrup is in positive engagement against the direction of the tensile force with the second leg of the other stirrup.

2. The device according to claim 1, wherein the first and second legs of each stirrup extend beyond a center axis of the thermal release element.

3. The device according to claim 1, wherein the first and second legs of each stirrup are resiliently pretensioned in a direction toward an axis of the thermal release element.

4. The device according to claim 1, wherein the two stirrups are of identical construction and are arranged symmetrically relative to each other turned by 180° about the direction of the tensile force.

5. The device according to claim 4, wherein each stirrup is of hardened flat strip steel.

6. The device according to claim 1, wherein the second leg of each stirrup is angle-shaped, and wherein, in the locked position of the separation device, the second leg of each stirrup rests on a side facing away from the thermal release element against the first leg of the other stirrup.

7. The device according to claim 1, wherein each first leg of the stirrups has an end, a hook being formed at the end of the first leg, wherein, in the locked position of the separation device, the hook engages in an opening in the second leg of the other stirrup.

8. The device according to claim 1, wherein the second leg of each stirrup has an end, a wedge-shaped lug being formed at the end of the second leg, wherein, in the locked position of the separation device, the lug engages in a correspondingly wedge-shaped window in the first leg of the other stirrup.

9. The device according to claim 1, wherein each stirrup comprises an eyelet constructed as a ring-shaped spring transmitting the tensile force.

10. The device according to claim 1, wherein each stirrup comprises an eyelet for transmitting the tensile force, the eyelet being a portion of the stirrup formed by twisting the portion by 90° about a tension axis.

11. The device according to claim 1, wherein the thermal release element is a glass bulb.

* * * * *